Sept. 10, 1935.

R. VELUT

ICE MACHINE

Original Filed April 13, 1932

Re. 19,699

Inventor:
René Velut,
By C. F. Wenderoth
Atty

Reissued Sept. 10, 1935

Re. 19,699

UNITED STATES PATENT OFFICE 19,699

ICE MACHINE

René Velut, Asnieres, France

Original No. 1,925,616, dated September 5, 1933, Serial No. 605,023, April 13, 1932. Application for reissue May 28, 1934, Serial No. 728,051. In France April 20, 1931

6 Claims. (Cl. 62—108)

The pretsent invention has for its object improvements in or to the manufacture of artificial ice.

Artificial ice is generally made in a large ice tank, containing smaller reservoirs or ice forms filled with the water to be frozen and almost entirely immersed in the non-freezing liquid, such as brine, filling the ice tank, which brine is cooled by suitably shaped cooling coils inside which the cold producing liquid is vaporized.

Preferably the brine is given a comparatively great speed so as to sweep more swiftly over the walls of the forms.

The devices of this type used heretofore show numerous drawbacks, the amount of brine is always considerable and consequently a long time is required for operating the cold producing compressor, before it is brought to the desired working temperature.

Moreover by reason of the speed required for the brine with a view to producing a speedy freezing in the forms, the brine must be propelled by means of screws or of pumps which require a large amount of power.

The ice tank must also be fluidtight throughout the height of the brine, i. e. in practice a little over the height of the forms.

Further, when the water is frozen, the forms must be removed from the brine upwardly and then after immersed downwardly into another tank in order to heat the walls of the forms before removing the ice formed. After this the forms are again removed from the second tank upwardly and set into a substantially horizontal position, in order to allow the easy removal of the block of ice.

For executing these operations it is necessary to use either very light forms or else mechanical lifting means in the usual case of heavy forms since it is advantageous to produce large blocks of ice which melt less during transportation.

Finally the ice produced according to the above method is opaque and difficult to sell. For producing transparent ice, it is necessary to mechanically agitate the water inside the forms while it is freezing.

Good results may be obtained by blowing air inside the forms, but this method is not easily executed with the forms immersed inside the brine.

In fact, as it is necessary for unmoulding to provide conical or pyramidal shaped blocks, the lower part of the block of ice is frozen before the upper part and as the air must be blown into the lower part of the forms, the movement of the air is stopped before water is completely frozen. If the air were introduced through movable blowing pipes, these latter sould be removed long before the freezing is at an end so as to avoid their lower part being stopped up by the ice.

Air is often blown through pipes disposed on the outside of the form and entering its lower part; the pipe is thus immersed throughout its length in the brine, which produces a condensing of the moisture and then after the freezing thereof, the ice thus produced closing the air pipes whereby the agitation of the water necessary for obtaining transparent ice is at an end.

The object of the present invention is a device avoiding said drawbacks and providing perfectly transparent ice with a minimum of handicraft.

The principal feature of the invention consists, instead of immersing the forms in a liquid which will not congeal at 0° centigrade, such as brine, in causing such liquid to stream over the part of the walls of the forms disposed above the normal level of the brine in the ice tank.

The fact that the forms are not entirely immersed in the brine allows their pivoting for reremoving the blocks of ice round horizontal axes arranged under their center of gravity thereof which avoids the long and tedius operations described hereinabove.

Such a device allows an easy blowing of air since it is sufficient therefor to connect the bottom of the forms with a compressed air container by means of yielding pipes long enough to allow the forms to rotate around a horizontal axis.

My improved device provides the following advantages: the amount of brine may be greatly reduced and the height for which the tank must be fluidtight may be limited to that corresponding to the depth of the brine which is no more in contant with the entire height of the forms.

The brine streams from the top to the bottom of the form under the action of gravity and its supply may be adjusted in a manner such that the top and bottom of the ice block are frozen substantially in a simultaneous manner.

The ice block is in fact thicker at the top where it is frozen with the coldest brine, and less thick at the bottom where it is frozen with already warmed up brine.

My improved method allows therefore the maintenance under low pressure of the agitation with a blowing of air until the water is completely frozen.

Thus the brine does not stream over the underside of the forms, and consequently the lowermost portion of the water does not freeze in contradistinction to the freezing devices used heretofore wherein the forms are immersed in the brine.

Further, the flexible pipes leading air to the bottom of the forms may be spaced with reference to the latter enough to prevent the brine from streaming too much over them, the condensation and freezing of the air moisture being thus avoided.

Finally the duct through which the stirring air arrives during the freezing process may also serve for removing the liquid water remaining at the end of the operation in the center of the block of ice, and after lifting of said block for filling again the form with water, the apparatus being thus again ready for operation.

Consequently the operations are controlled merely by the actuation of some cocks, the tilting of the forms and the return thereof when empty; this is simple and requires substantially no energy.

I have described hereinbelow, with reference to accompanying drawing and by way of example, a form of execution of the invention.

Figure 1:
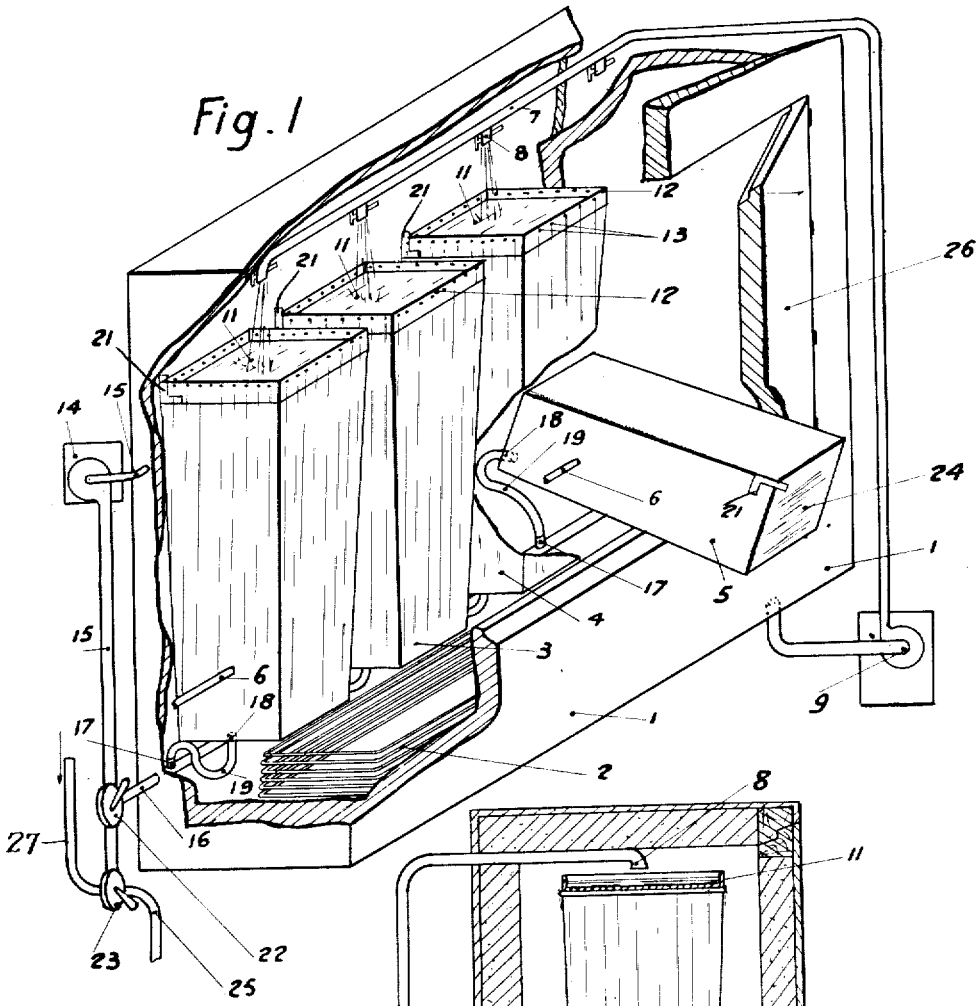
Fig. 1 shows diagrammatically the whole machine.

The apparatus (Fig. 1) is enclosed inside a casing 1, a great part of which has been broken away in Fig. 1; the lower part of said casing is fluidtight and forms a brine tank; it contains a cooling coil 2 inside which the cold producing fluid moves.

Above the tank are disposed the forms 3, 4, 5 shaped as frusto-pyramids the cross-sections of which increase as they are taken higher; these forms may rotate round a horizontal shaft 6; in their operative position they are vertical as shown for the forms 3 and 4; the form 5 is shown as upset, viz. in the position given thereto at the end of the operation, for removing the ice block formed therein.

At the top of the casing 1 is a duct 7 with several cocks such as 8 disposed just over the forms. This duct is connected with a pump 9, driven by a motor (not shown), and fed with the brine contained in the bottom of casing 1. The forms are closed by caps 11 (the cap on form 5 is supposed to be removed), which caps are provided with flanges having apertures 13.

The working of the device is as follows:

The bottom of casing 1 being filled with brine cooled to a suitable temperature, and the cold producing fluid being set in motion in cooling coil 2, the pump 9 is started. The brine is sent into duct 7 out of which it flows through the cocks 8. It falls on to the middle of the caps 11, out of which it flows through apertures 13 over the side walls of the forms which are cooled not only through contact but also through the evaporation of the brine streaming as a thin layer over a large area.

The brine falls again into the bottom of casing 1, after streaming over the cooling coil 2, or the upper tubes thereof if the lower tubes are immersed in the brine; the brine is thus cooled by the cooling coil. The brine may again be drawn up by the pump 9, and discharged anew against the forms to cool the latter.

Sometimes it may be of advantage to arrange a second cooling coil between the duct 7 and the top of the forms so that the brine may be cooled by passing over said cooling coil just before it streams over the walls of the forms.

As stated above, for obtaining transparent ice, I stir the water during freezing by blowing air therethrough. The air stream is produced by a fan 14 which through the pipe 15 sucks air out of the casing 1. Inside the latter the temperature is very low whereby the air moisture will be quickly condensed; thus the air blown by the fan 14 through the forms will be quite dry; the condensation and still more the freezing of moisture inside the pipes is thus avoided; on the other hand the air already cooled abandons only very little heat during its passage through the forms.

The air is sent from the fan into the duct 16, provided with as many cocks 17 as there are forms, which latter are themselves provided with cocks 18 at their lower ends; cocks 17 and 18 are interconnected through the flexible tubes 19 the length of which is great enough to allow the forms to be pivoted round their axes and brought into the position illustrated for form 5. After having travelled through the water filling a form, the air escapes through a vent 21 at the top thereof.

As soon as the operation has begun and the brine streams over the forms, the fan 14 is started, and the threeway cocks 22 and 23 are actuated so as to connect the fan with duct 16 whereby the air is blown through the water to be frozen.

When the water is frozen, the pump 9 and fan 14 are stopped. Each form contains an ice block 24, showing at its bottom the usual central hollow wherein the impurities of the water gather. The cocks 22 and 23 are actuated so as to separate duct 16 from pipe 15 and to connect it with the exhaust 25 through which the impure water remaining in the hollows of the ice blocks is removed.

This being done, the doors 26 of the casing 1 are opened, the forms are pivoted (as shown for form 5); the ice block is freed through gravity and can be easily removed and loaded on a car.

When all the forms have been emptied and the caps replaced, the forms are set in their upright positions which requires only a slight effort; they are then filled again with pure water in order to make them ready for another operation. To this effect the cocks 22 and 23 are again actuated for separating duct 16 from pipes 15 and 25 and connecting it with tube 27 fed from the pure water supply (not shown).

It is obvious that at the beginning of the following operation, the water will fill the duct 16 and part of the pipe 15, but the pressure of the air from the fan 14 will drive it back into the forms.

Figure 2:
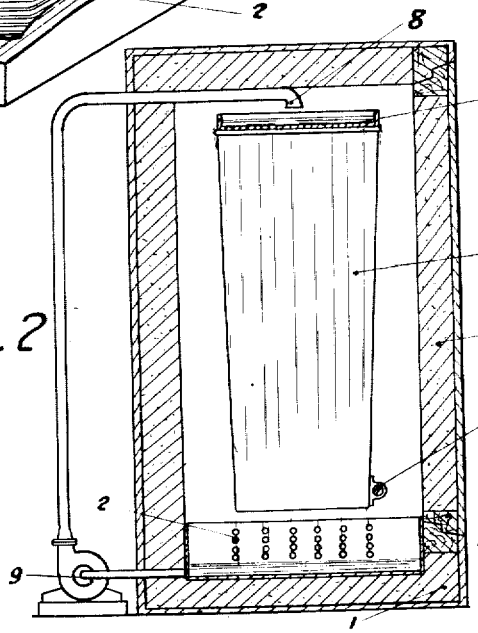
Fig. 2 is a cross-section showing the arrangement of the form, streaming device and cooling coils inside the casing of the machine.

Fig. 2 illustrates, in a more detailed manner than Fig. 1 which, with a view to a greater clearness, is quite diagrammatical, how the casing 1 and its door 26 may be arranged in practice with a careful protection against external heat, the form 3 being shown with its shaft 6 around which the form is adapted to pivot without any difficulty.

What I claim is:

1. An ice machine comprising a casing, the bottom of which is fluid-tight, forms disposed in said casing above said bottom and having substantially vertical walls, caps closing the upper end of said forms and provided with an apertured vertical flange raised on the periphery of the form; a pipe extending over said forms; means for feeding the pipe with a cold liquid which will not congeal at 0° centigrade; means for causing all of said liquid form the pipe, coming in gushes, to fall onto the caps of the forms and stream therefrom by gravity substantially to the bottom of the forms along the vertical walls of same and to be collected in the bottom of the casing; means for cooling the thus collected liquid, and means for returning said cooled liquid to the pipe feeding means.

2. An ice machine comprising a casing the bottom of which is fluid-tight and a vertical side of which is openable, a shaft disposed inside the casing above said bottom; forms in said casing and having substantially vertical walls, means for pivotally securing said forms on said shaft so that their center of gravity will be above the shaft so that they can rock in a substantially horizontal position; a pipe disposed above the forms, means for feeding the pipe with a cold liquid which will not congeal at 0° centigrade, means for causing all of said liquid, coming in gushes, to fall from said pipe onto the top of each form; means for causing said liquid to stream downwards by gravity substantially from the top to the bottom of the forms along the vertical walls of the same, and to be collected in the bottom of the casing; means for cooling the liquid thus collected, means for returning said cooled liquid in the pipe feeding means.

3. An ice machine comprising a casing the bottom of which is fluid-tight and a vertical side of which is openable, a shaft disposed inside the casing above said bottom; forms in said casing and having substantially vertical walls, means for pivotally securing said forms on said shaft so that their center of gravity will be above the shaft so that they can rock in a substantially horizontal position, caps closing the upper larger end of said forms and provided with an apertured vertical flange raised on the periphery of the form; a pipe disposed over said forms; means for feeding the pipe with a cold liquid which will not congeal at 0° centigrade; means for causing all of said liquid from the pipe, coming in gushes, to fall onto the caps of the forms and stream therefrom by gravity substantially to the bottom of the forms along the vertical walls of the same and to be collected in the bottom of the casing means for cooling the liquid thus collected; means for returning said cooled liquid in the pipe feeding means.

4. An ice machine comprising a casing the bottom of which is fluid-tight and a vertical side of which is openable, a shaft disposed inside the casing above said bottom; forms in said casing and having substantially vertical walls; means for pivotally securing said forms on said shaft so that their center of gravity will be above the shaft so that they can rock in a substantially horizontal position, caps closing the upper larger ends of said forms and provided with an apertured vertical flange raised on the periphery of the form; a pipe disposed over said forms, means for feeding the pipe with a cold liquid which will not congeal at 0° centigrade, means for controlling said feeding, means for causing all of said liquid from the pipe, coming in gushes, to fall onto the caps of the forms and stream therefrom by gravity substantially to the bottom of the forms along the vertical walls of the same and to be collected in the fluid-tight bottom of the casing; a cooling coil disposed in said bottom, means for feeding said cooling coil with cold-producing fluid, a pump, means for connecting the intake of said pump with the bottom of the casing, means for connecting the outlet of said pump with the pipe-feeding means, and means for removing the impure unfrozen water remaining in the central hollow of the frozen blocks formed in the forms.

5. An ice machine comprising a casing the bottom of which is fluid-tight and a vertical side of which is openable, a shaft disposed inside the casing above said bottom; forms in said casing and having substantially vertical walls; means for pivotally securing said forms on said shaft so that their center of gravity will be above the shaft so that they can rock in a substantially horizontal position; a pipe disposed above the forms, means for feeding the pipe with a cold liquid which will not congeal at 0° centigrade, means for causing all of said liquid, coming in gushes, to fall from said pipe onto the top of each form; means for causing said liquid to stream downwards by gravity substantially from the top to the bottom of the forms along the vertical walls of the same, and to be collected in the bottom of the casing; means for cooling the liquid thus collected, means for returning said cooled liquid to the pipe-feeding means, a duct inside the casing, disposed at substantially the same level as the bottoms of the forms, a fan, means for feeding the fan with air from the casing, means for connecting the exhaust of the fan with the duct, flexible means for connecting the duct with the bottom of the forms, means for connecting the upper end of the forms with the inside of the casing, and means for removing the impure unfrozen water remaining in the central hollow of the frozen blocks formed in the forms.

6. An ice machine comprising a casing the bottom of which is fluid-tight and a vertical side of which is openable, a shaft disposed inside the casing above said bottom; forms in said casing and having substantially vertical walls, means for pivotally securing said forms on said shaft so that their center gravity will be above the shaft so that they can rock in a substantially horizontal position, a pipe disposed above the forms, means for feeding the pipe with a cold liquid which will not congeal at 0° centigrade, means for causing all of said liquid, coming in gushes, to fall from said pipe onto the top of each form; means for causing said liquid to stream downwards by gravity substantially from the top to the bottom of the forms along the vertical walls of the same, and to be collected in the bottom of the casing; means for cooling the liquid thus collected, means for returning said cooled liquid to the pipe-feeding means, a duct inside the casing, disposed at substantially the same level as the bottoms of the forms, a fan, means for feeding the fan with air from the casing, flexible means for connecting the duct with the bottom of the forms, means for connecting the upper end of the forms with the inside of the casing; and a cock system for connecting one end of the duct at will either with the exhaust of the fan, with an exhaust for the impure unfrozen water remaining in the central hollow of the frozen blocks, or with a fresh water supply for feeding the forms.

RENÉ VELUT.